United States Patent [19]

Behle et al.

[11] 4,440,379

[45] Apr. 3, 1984

[54] BOTTOM OPERATOR FOR TOP OPERATED BOTTOM INSTALLED TANK CAR VALVE ASSEMBLY

[75] Inventors: Gunter R. Behle, St. Peters; David P. Hillstead, St. Charles, both of Mo.

[73] Assignee: ACF Industries, Incorporated, New York, N.Y.

[21] Appl. No.: 369,043

[22] Filed: Apr. 16, 1982

[51] Int. Cl.³ .................... F16K 27/03; F16K 51/00
[52] U.S. Cl. .................................. 251/144; 251/289; 251/291; 137/327
[58] Field of Search .................. 137/315, 316, 327; 251/144, 289, 291

[56] References Cited

U.S. PATENT DOCUMENTS

| | | | |
|---|---|---|---|
| 4,137,937 | 2/1979 | Reedy | 251/144 |
| 4,240,607 | 12/1980 | Carlson | 137/327 |
| 4,272,053 | 6/1981 | Wempe et al. | 251/289 |
| 4,310,145 | 1/1982 | Wempe | 251/144 |
| 4,318,531 | 3/1982 | Carlson | 251/144 |
| 4,326,557 | 4/1982 | Behle | 137/316 |

*Primary Examiner*—A. Michael Chambers
*Attorney, Agent, or Firm*—Henry W. Cummings; J. Joseph Muller

[57] ABSTRACT

In accordance with the present invention, an unloading assembly for a top operated lading valve is disclosed. The unloading assembly includes means for connecting an unloading outlet chamber to the existing depending valve outlet chamber of the lading valve. The unloading outlet chamber is hollow and is in fluid communication with the lading valve outlet chamber. The unloading assembly includes an operating shaft extending upwardly through the unloading outlet chamber and through the valve outlet chamber. The operating shaft includes a non-round connection portion adapted to engage a non-round connection portion of the top operating rod.

14 Claims, 5 Drawing Figures

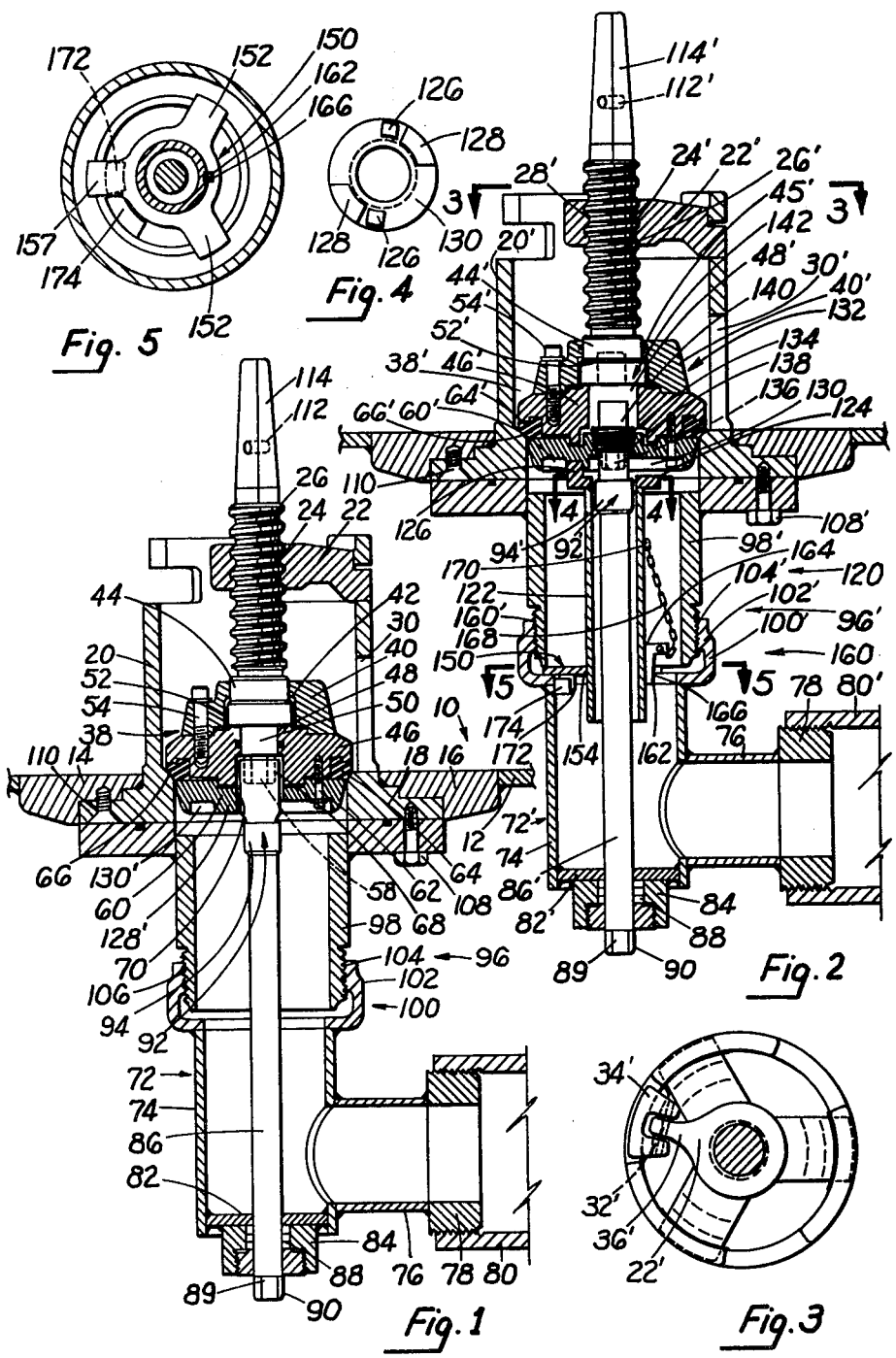

BOTTOM OPERATOR FOR TOP OPERATED BOTTOM INSTALLED TANK CAR VALVE ASSEMBLY

BACKGROUND OF THE INVENTION

In U.S. Pat. No. 4,326,557 granted Apr. 27, 1982, a top operated lading valve assembly including a threaded valve cage located inside the tank is disclosed which is installed from the bottom of the tank. Thus the attendant need not enter the tank to install or replace this lading valve assembly.

However, if the operating rod which extends to the top of the tank becomes broken or otherwise inoperative, a problem arises as to how to move the lading valve between open and closed positions. If the lading valve is closed and lading is located within the tank, an arrangement is needed to open the lading valve without the attendant having to enter a loaded tank.

In U.S. Pat. No. 4,137,937, issued Feb. 6, 1979, an adapter is disclosed for use in connection with a bottom operated tank car lading valve. This adapter is intended for use at destination to load and/or unload the lading. One embodiment includes a pair of unloading spouts to facilitate unloading in emergency situations such as unloading the lading in a derailed railway tank car.

However, this adapter is designed for use with a bottom operated tank car valve having a bottom operating mechanism which does not include a threaded cage through which top operator rotates in moving the lading valve between open and closed position. Furthermore, there is no need to move a rotatable element into threaded engagement with the remaining portion of the top operating rod to rotatably move the remaining operating rod portion of the top operating rod through the valve cage.

In U.S. Pat. No. 4,240,607, granted Dec. 23, 1980, a top operable lading valve assembly is disclosed including a valve seal retainer including a vertical projection extending through an opening in the lading valve into an opening in the bottom surface of the top operating rod. After removal of the outlet chamber if the top operating rod is damaged, the lading valve is operable from the bottom of the tank by removing the seal retainer and extending a tool having a non-round end into the non-round opening in the bottom of the remaining portion of the top operating rod, rotating the rod through the cage and lifting the lading valve to open position.

However, this arrangement is undesirable because with the outlet chamber removed if there is lading in the tank when the tool is inserted and the valve opened, there is no convenient way of attaching a pipe or container to collect the lading.

SUMMARY OF THE INVENTION

The object of the invention is to provide an adapter assembly for a top operated bottom outlet valve having a damaged or inoperative top operator including means for collecting any lading which may run out of the tank during unloading.

Another object of the invention is to provide an adapter assembly including collecting means for the lading which contains a rotatable bottom operating rod having connecting means at its upper end for engaging the bottom of the remaining top rod portion to rotate the same through a threaded cage and at the same time open the lading valve.

Another object of the present invention is to provide a top operated lading valve having an opening to receive a bottom operator for use in the event of damage to the top operator and including means tending to insure connection between the bottom operator and the lower portion of the remaining top operator.

In accordance with the present invention, an unloading assembly for a top operated lading valve is disclosed. The unloading assembly includes means for connecting an unloading outlet chamber to the existing depending valve outlet chamber of the lading valve. The unloading outlet chamber is hollow and is in fluid communication with the lading valve outlet chamber. The unloading assembly includes an operating shaft extending upwardly through the unloading outlet chamber and through the valve outlet chamber. The operating shaft includes a non-round connection portion adapted to engage a non-round connection portion of the top operating rod.

A valve cage preferably installable from the bottom includes a generally horizontally extending threaded valve sleeve. This threaded valve sleeve normally receives a threaded portion of the top operating rod. The lading valve is provided with an opening through the center portion thereof and connecting means to the top operating rod extend through this opening in the lading valve.

In one embodiment, the operating shaft connection portion engages directly a depending portion of the remaining top operating rod. Clearance is provided in the lading valve and in a seal retainer plate to allow this engagement. This embodiment is particularly adapted to the wiping type of top operated lading valve in which rotation of the operating shaft relative to the lading valve does not occur.

Another embodiment of the invention is particularly adapted to the non-wiping type of top operated lading valves wherein the top operator is rotatable relative to the lading valve. In this embodiment means are provided on the unloading assembly to prevent rotation of the lading valve during engagement of the bottom operating shaft portion with the depending top operating portion. In this embodiment, during connection between the bottom operator and the depending top operating portion, the lading valve moves vertically but does not rotate as the lower operating shaft and the depending top operator rotate, and the top operating shaft moves through the threaded sleeve.

In accordance with another feature of this embodiment, an adapter is threaded into the opening in the lading valve. The adapter includes a lower connection portion which is engaged by the bottom operator. The adapter includes a top connection portion adapted to engage the top operator. When the lading valve is prevented from rotating, the connection portion of the bottom operator engages the lower connection portion of the adapter and rotation moves the adapter upper connection portion into engagement with the upper operator.

The means for preventing rotation of the lading valve preferably comprises a hollow sleeve having at least one projection at its upper end which engages a cooperating stop on the lading sleeve.

Another feature of the present invention includes locating means to locate the unloading chamber relative to the existing outlet chamber to accomodate different sizes of existing outlet chambers. Means are provided for fixing the outlet chamber at a desired location on the sleeve extending upwardly toward the lading valve.

IN THE DRAWINGS

FIG. 1 is a vertical sectional view of one embodiment of the present invention.

FIG. 2 is a vertical sectional view of another embodiment of the present invention.

FIG. 3 is a horizontal sectional view looking in the direction of the arrows along the line 3—3 in FIG. 1.

FIG. 4 is a horizontal sectional view looking in the direction of the arrows along the line 4—4 in FIG. 2.

FIG. 5 is a horizontal sectional view looking in the direction of the arrows along the line 5—5 in FIG. 2.

DESCRIPTION OF PREFERRED EMBODIMENTS

Reference may be made to Ser. No. 142,309, filed Apr. 21, 1980, now U.S. Pat. No. 4,326,557, for a suitable bottom installed, top operated lading valve assembly to which the present invention is adapted. In the event that the top operating rod described in Ser. No. 142,309, now U.S. Pat. No. 4,326,557, should be damaged or broken such that operation from the top of the tank through the operating rod is not possible, the unloading assembly of the present invention may be utilized.

As described in greater detail in said Ser. No. 142,309 a railway tank car 10 includes a tank bottom 12 into which is mounted a tank mounting flange 14. Mounting flange 14 includes a stepped opening 16 into which is located a valve cage flange 18. Cage flange 18 is integral with a plurality of vertically extending cage legs 20 which support a transversely extending cage sleeve 22 which is internally threaded at 24 and is adapted to receive a top operating portion 26 having cooperating external threads 28. Legs 20 contain openings 30 through which lading may flow from the tank 10. Horizontal sleeve 22 is prevented from rotating in any convenient manner such as by a fastener 32 extending through a lug 34 integral with legs 20 and through a projecting portion 36 of horizontal portion 22. (FIG. 3)

A lading valve 38 includes a top portion 40 having an opening 42 which receives a bottom portion 44 of a damaged top operator 26. A lower valve portion 46 includes an opening 48 which receives a top operating portion 50 which has an enlarged head portion 52 located within the top valve portion 40. Portion 52 is integral with top operating portion 44. Fasteners 54 hold valve portions 40 and 46 together and hold shaft portions 50, 52 and 44 in assembly. Shaft portion 50 has a depending non-round connection portion 58.

A seal retainer 60 is held in place below valve portion 46 with fasteners 62. Retainer 60 holds a seal 64 in place. In closed position seal 64 is in engagement with a valve seat 66 located in cage portion 18. Opening 48 is enlarged at 68 and retainer 60 includes an opening 70 whereby access to the lower connection portion 58 is provided from the bottom of the valve assembly.

An unloading chamber 72 includes a cylindrical body portion 74 having a spout 76 which is welded or cast thereto and includes a threaded portion 78 adapted to receive a suitable unloading conduit 80. Body portion 74 includes a closure plate 82 having attached thereto a depending packing support assembly 84. An operating shaft 86 extends through the packing 88. At its lower end, shaft 86 is provided with a non-round connection portion 90. Shaft 86 has an upper non-round connection portion 92, for example, comprising a non-round slot 94.

Unloading chamber body portion 74 is provided with means 96 for connecting the unloading chamber to an existing, depending outlet chamber 98. Connecting means 96 conveniently comprises a cap 100 welded to body portion 74 and including an upwardly extending skirt 102 having threads 104 adapted to engage cooperating threads 106 on existing outlet chamber 98.

Non-round slot 94 is adapted to engage depending non-round connection portion 58. For a standard depending outlet chamber 98 of 7", operating shaft 86 including its connection 92 may be made 17" in length. Thus when cap 102 threadably engages threaded portion 106 of standard outlet 98, slot 94 will be in engagement with connection portion 58. Alternatively, shaft 86 may be somewhat longer than necessary for the standard distance, and may be shoved through packing 88 and into engagement with portion 58.

Since valve 38 is of the wiping type, valve 38 and shaft 26 are essentially integral. Thus rotation of connection portion 58 will rotate valve 38 and will rotate shaft portion 26. This will move shaft portion 26 upwardly through threaded portion 28 in horizontal cage portion 22. Lading can then flow from the tank through opening 30, through valve seat 66, and into hollow outlet chamber 98. From there, the lading flows through body portion 74, through spout 76 and out through conduit 80.

After removal of the lading, the outlet chamber 98 can be removed from the bottom by removing fasteners 108, then fasteners 110 can be removed and the valve cage and in all liklihood damaged top operating portion 26 can be removed from the bottom as described in Ser. No. 142,309. This avoids the attendant having to enter the tank. Alternatively, the connecting fastener 112 may be removed from the bottom whereby the damaged portion of the operating shaft may be removable from the top. If the fastener 112 is jammed, the portion 114 can be cut with a saw or torch, depending on commodity. Thus one of the features of the invention is the likelihood that the attendant will have to enter the tank to repair the top operating valve is substantially reduced or eliminated.

Most outlet chambers 98 are of standard 7" extending below the mounting flange 14. However, there are some non-standard mounting flanges. Shaft 86 has additional length 89 extending below the packing assembly 84 to allow for such variations.

Another embodiment of the invention directed to a nonwiping lading valve is illustrated in FIG. 4. In the non-wiping arrangement, shaft 26' can rotate relative to valve 38'. Fasteners 54' hold upper valve portion 40' in engagement with lower valve portion 46'. However, clearance is provided between shaft portion 44' and valve portion 40' such that operating portion 26' may rotate relative to the valve member 38'. A seal 45' is provided for this purpose.

In this embodiment means are provided on the unloading chamber to prevent rotation of the lading valve during initial rotation of the operating shaft 86' and a depending connection portion from the damaged top operating shaft.

In accordance with this embodiment, means 120 are provided to prevent rotation of the valve 38' while the connection portion 92' rotates the top operating shaft portion 26'. Means 120 includes a cylindrical skirt or sleeve 122 surrounding shaft 86' and having a top plate 124 which includes at least one and preferably a pair of projections 126 as illustrated in FIG. 4. In addition, seal retainer 60' is provided with at least one and preferably a pair of laterally spaced stops 128 extending downwardly into a slot portion 130. Engagement of the projections 126 with the stops 128 will prevent rotation of the seal retainer 60' and the valve 38'.

After this engagement, the non-round connection portion 92' is adapted to engage an adapter 132 located within opening 48' in valve member 38'. Adapter 132 includes an externally threaded body portion 134 and a depending non-round connection portion 136. Threaded portion 134 is threaded into a cooperating threaded portion 138 on seal retainer 60'. Adapter 132 further includes an upper non-round connection portion 140. It is thus apparent that with projections 126 engaging stops 128 on the seal retainer and preventing rotation of valve 38' that non-round portion 92 may rotate depending non-round portion 136 and move adapter 132 vertically by virtue of the cooperating threads 134 and 138 to a position wherein top non-round portion 140 engages a non-round slot 142 in the lower portion 52' of top operator 26'.

However, it will be apparent that continued rotation of operating shaft 86' after adapter connection portion 140 engages non-round slot 142, that operating shaft portion 26' will be rotated and it will move vertically through the threaded portion 24' of horizontal cage portion 22'. Shaft portion 52', however, will lift valve element portion 40' vertically. Thus the seal 64' will be lifted off the seat 66' and lading can exit through openings 30' and into outlet chamber 98' in the conventional manner. The lading will then exit out of spout 76' and conduit 80'.

In exiting, the lading passes through a stabilizing plate 150 illustrated in FIG. 5 including a plurality of outwardly extending spokes 152. For many applications, the distance between the bottom of the outlet chamber 98' and the bottom of the surface of the seal retainer 60' is a constant of 7". For a simplified unloading assembly, to meet this standard outlet chamber, the plate 150 simply may be welded to the sleeve 122 as illustrated at 154. However, if the outlet chamber 98' is longer than the standard dimension, location of the plate 150 at this fixed distance will not enable engagement of projections 126 with stops 128 on the seal retainer. It is estimated that if plate 150 is nonadjustable, the unloading assembly will fit 15% of the existing outlet chambers.

However, in accordance with another feature of the present invention, it is preferred to provide a vertically adjustable non-rotating means 160. Vertically adjustable means 160 comprises a slot 162 located in plate 150. A key 164 is used to locate the plate 150 relative to sleeve 122. Key 164 includes a tapered member 166 which fits within slot 162. Key 164 is conveniently connected to a chain 168 which is welded to the sleeve 122 as indicated at 170.

In use the attendant utilizes a ruler or other suitable measuring device to measure the distance from the bottom of the seal retainer 60' to the lower end of the outlet chamber 98'. Then in a subassembly operation, the attendant locates the plate 150 upon the sleeve 122, downwardly from the upper end of projection 126 this same distance. Thus when plate 150 abuts the bottom surface of outlet chamber 98, extension 126 will be located within slot 130 and will be able to engage stops 128.

Thus after cap 102' is removed from threads 104', and the attendant has made the necessary measurement, plate 150 will be properly located on sleeve 122. The attendant then lifts the unloading chamber 72' upwardly and plate 150 abuts the bottom of outlet chamber 98'. The projections 126 extend upwardly and should be located within slot 130. If they abut stops 128, it is necessary to rotate the sleeve 122 until no abutment occurs.

Plate 150 includes a depending stop 172, FIG. 5. Unloading body portion 74' includes an upwardly projecting stop 174. After plate 150 is located in place upon sleeve 122, the unloading chamber 72' is used to support plate 150 and stops 172 and 174 abut. This stops rotation of sleeve 122 as cap 102' is rotated. Sleeve 122 moves upwardly and projection 126 enters slot 130 during the last part of the rotation of cap 100' on threads 106'. Rotation of sleeve 122 and projection 126 thereafter ceases. Stops 172 and 174 prevent rotation of assembled means 120, due to rotation of valve member 38' with adapter 132 rusted in place, for example, or when plate 150 is not being held in place solidly by unloading chamber 72.

It is thus seen that the embodiment shown in FIGS. 3-5 is adapted for use with the non-wiping type of valve wherein the operating shaft portion 26 rotates relative to the lading valve 38'. Projecting means 120 are provided to prevent rotation of the valve while the connection portion 26 is engaged by a suitable bottom operating shaft connection portion 92.

In addition, means are provided whereby the projecting means 120 are adjustable vertically to meet differing lengths of unloading chambers.

The embodiment shown in FIGS. 1-3 is adapted for use with the wiping type of valves wherein the operating shaft 26 in integral with the valve 38 and rotates therewith. In the situation shown in FIG. 1, where the connection portion 92 directly engages the operating shaft non-round portion 58, no projecting means to prevent rotation of the valve are required. Upon engagement with shaft portion 92 the valve and the operating shaft rotate and move vertically through the threads 24 to the open position.

It is within the scope of the present invention to utilize an adapter of the type shown at 132 with the embodiment shown in FIG. 1. If such an adapter were utilized, for example in applications where it is possible that a viscus material would locate within the slot portion 68 preventing access of the non-round connection 92, then projecting means of the type shown at 120 would be necessary to prevent rotation of the valve during the period wherein the connection portion 92' is moving the adapter 132 from the position shown in FIG. 4 until the connection portion 140 engages the non-round slot 142. Thus for this purpose, as shown in FIG. 1, a slot 130' is shown including a projection 128', which would be engaged by a projection of the type 126 shown in FIG. 5. However, once the adapter portion 132 becomes engaged with the non-round slot 142, and the attendant feels tension in attempting to rotate the shaft 86', the unloading chamber 72' must be removed from engagement and the projections 126 and the sleeve 122 disengaged. Then the connection portion 92' alone can be utilized to rotate the connection portion 136 and the shaft 26 through threads 24 and thus rotate the valve 38 and move it vertically to open position.

What is claimed is:

1. For use in a top operated lading valve assembly located in a tank bottom and including a valve seat and threaded valve cage through which a threaded top operator extends and including a vertically movable lading valve having a lading valve opening; sufficient clearance existing between said top operator and said lading valve whereby said lading valve may rotate relative to said top operator; top operating connecting means extending downwardly through said lading valve opening; and including a depending lading valve outlet chamber, an unloading assembly for operating the lading valve assembly from the bottom comprising:

a hollow body portion having means at its upper end for connecting the body portion to the lading valve outlet chamber; bottom operating shaft means having a lower non-round end located below said body portion; said bottom operating shaft having an upper connection portion adapted to engage said top operator connecting means whereby said top operator may be rotated by said bottom operating shaft means and said lading operating shaft means and said lading valve moved vertically relative to said valve seat; said unloading assembly including means separate from said upper connection portion for preventing rotation of said lading valve while said top operator is rotated by said bottom operating shaft means.

2. For use in a top operated lading valve assembly located in a tank bottom and including a valve seat and threaded valve cage through which a threaded top operator extends and including a vertically movable lading valve having a lading valve opening; sufficient clearance existing between said top operator and said lading valve whereby said lading valve may rotate relative to said top operator; top operating connecting means extending downwardly through said lading valve opening; and including a depending lading valve outlet chamber, an unloading assembly for operating the lading valve assembly from the bottom comprising:

a hollow body portion having means at its upper end for connecting the body portion to the lading valve outlet chamber; bottom operating shaft means having a lower non-round end located below said body portion; said bottom operating shaft having an upper connection portion adapted to engage said top operator connecting means whereby said top operator may be rotated by said bottom operating shaft means and said lading valve moved vertically relative to said valve seat; said unloading assembly including means for preventing rotation of said lading valve while said top operator is rotated by said bottom operating shaft means; said means for preventing rotation of said valve comprising a member projecting upwardly through said lading valve outlet chamber from said body portion.

3. An unloading assembly according to claim 2, wherein said means for preventing rotation comprise a portion hollow sleeve extending upwardly from said body through which bottom operating shaft passes.

4. An unloading assembly according to claim 3, wherein a seal retainer is located below said lading valve and wherein said sleeve member engages a portion of said seal retainer.

5. An unloading assembly according to claim 4, wherein said seal retainer is provided with at least one depending stop which is engaged by at least one lug on said sleeve member.

6. An unloading assembly according to claim 5, wherein said unloading assembly includes a stabilizing plate having open portions for lading flow which engages the bottom of said lading valve outlet chamber.

7. An unloading assembly according to claim 6, wherein said stabilizng plate includes a plurality of spokes which engage said lading valve outlet chamber.

8. An unloading assembly according to claim 6, wherein said plate is integral with said sleeve and is located a fixed distance below said lugs.

9. An unloading assembly according to claim 6, wherein attaching means are provided to locate said unloading assembly body portion at selected points on said sleeve.

10. An unloading assembly according to claim 9, wherein said attaching means locate said plate at selected points on said sleeve.

11. An unloading assembly according to claim 10, wherein stop means are provided on said plate and on said body portion to prevent rotation of said sleeve while said body portion is attached to said lading valve outlet chamber.

12. An unloading assembly according to claim 10, wherein a slot is provided in said plate and a tapered key extends within said slot and engages said sleeve with an interference fit.

13. An unloading assembly according to claim 6, wherein said top operating shaft connecting means comprises an adapter having a lower non-round adapter connection portion and wherein said bottom operating shaft connection portion engages said lower adapter connection portion and rotation of said bottom operating shaft moves said adapter vertically and into engagement with said top operator.

14. For use in a top operated lading valve assembly located in a tank bottom and including a valve seat and threaded valve cage through which a threaded top operator extends and including a vertically movable lading valve body having a lading valve opening; top operating connecting means extending downwardly through said lading valve opening; and including a depending lading valve outlet chamber, an unloading assembly for operating the lading valve assembly from the bottom comprising:

a hollow body portion having means at its upper end for connecting the body portion to the lading valve outlet chamber; bottom operating shaft means having a lower non-round end located below said body portion; said bottom operating shaft having an upper connection portion adapted to engage said top operator connecting means whereby said top operator may be rotated by said bottom operating shaft means and said top operating shaft means and said lading valve moved vertically relative to said valve seat; said top operator connecting means comprising an adapter located within said lading valve body which is rotatable by said bottom operating shaft means to move a portion of said adapter into engagement with said top operator, whereby said bottom operating shaft means coacts with said top operator to move said valve body vertically.

* * * * *